(12) United States Patent
Liang et al.

(10) Patent No.: US 11,996,580 B2
(45) Date of Patent: May 28, 2024

(54) BATTERY, POWER CONSUMPTION DEVICE, AND METHOD AND DEVICE FOR PRODUCING BATTERY

(71) Applicant: JIANGSU CONTEMPORARY AMPEREX TECHNOLOGY LIMITED, Jiangsu (CN)

(72) Inventors: Chengdu Liang, Jiangsu (CN); Jiarong Hong, Jiangsu (CN); Haiqi Yang, Jiangsu (CN); Xiaoteng Huang, Jiangsu (CN); Wenli Wang, Jiangsu (CN); Langchao Hu, Jiangsu (CN); Cheng Xue, Jiangsu (CN)

(73) Assignee: JIANGSU CONTEMPORARY AMPEREX TECHNOLOGY LIMITED, Jiangsu (CN)

( * ) Notice: Subject to any disclaimer, the term of this patent is extended or adjusted under 35 U.S.C. 154(b) by 284 days.

(21) Appl. No.: 17/138,818

(22) Filed: Dec. 30, 2020

(65) Prior Publication Data

US 2022/0123430 A1 Apr. 21, 2022

Related U.S. Application Data

(63) Continuation of application No. PCT/CN2020/121990, filed on Oct. 19, 2020.

(51) Int. Cl.
*H01M 50/383* (2021.01)
*A62C 3/16* (2006.01)
*H01M 10/48* (2006.01)

(52) U.S. Cl.
CPC .............. *H01M 50/383* (2021.01); *A62C 3/16* (2013.01); *H01M 10/482* (2013.01); *H01M 2200/10* (2013.01); *H01M 2200/20* (2013.01)

(58) Field of Classification Search
CPC .............. H01M 50/383; H01M 50/375; H01M 10/482; H01M 2200/10; H01M 2200/20;
(Continued)

(56) References Cited

U.S. PATENT DOCUMENTS

2003/0003350 A1 1/2003 Heimer et al.
2006/0255764 A1 11/2006 Cho
(Continued)

FOREIGN PATENT DOCUMENTS

CN 1306679 A 8/2001
CN 205508970 U 8/2016
(Continued)

OTHER PUBLICATIONS

Intention to Grant dated Jul. 28, 2022 received in European Patent Application No. EP 20 827 972.9.
(Continued)

*Primary Examiner* — Christopher P Domone
(74) *Attorney, Agent, or Firm* — Scully, Scott, Murphy & Presser, P.C.

(57) ABSTRACT

A battery, a power consumption device, and a method and device for producing a battery are provided. The battery includes: a battery cell including a pressure relief mechanism configured to be actuated when an internal pressure or temperature of the battery cell reaches a threshold, to relieve the internal pressure; and a fire-fighting pipeline configured to accommodate a fire-fighting medium and discharge the fire-fighting medium when the pressure relief mechanism is actuated; where the fire-fighting pipeline is covered with an isolation layer, and the isolation layer is configured to block the contact of gases and the fire-fighting pipeline so as not to generate condensate. In a battery provided by the present application the fire-fighting pipeline is covered with an isolation layer, and the isolation layer may be configured to
(Continued)

reduce the influence of the condensate on the battery and improving the safety of the battery.

20 Claims, 9 Drawing Sheets

(58) Field of Classification Search
CPC .......... H01M 10/613; H01M 50/143; H01M 2200/00; A62C 3/16; A62C 3/07; Y02E 60/10; Y02P 70/50; Y02T 10/70
See application file for complete search history.

(56) References Cited

U.S. PATENT DOCUMENTS

| | | | |
|---|---|---|---|
| 2010/0136391 A1 | 6/2010 | Prilutsky et al. | |
| 2011/0177382 A1 | 7/2011 | Kim | |
| 2012/0114993 A1 | 5/2012 | Park et al. | |
| 2014/0170447 A1 | 6/2014 | Woehrle et al. | |
| 2014/0242424 A1* | 8/2014 | Jones | H01M 10/625 429/61 |
| 2015/0287963 A1 | 10/2015 | Chiba | |
| 2017/0256764 A1 | 9/2017 | Li | |
| 2018/0138478 A1 | 5/2018 | Chan | |
| 2019/0348649 A1 | 11/2019 | Ryu et al. | |
| 2020/0058967 A1* | 2/2020 | Berge | F28D 20/02 |
| 2020/0212524 A1 | 7/2020 | Wang et al. | |
| 2020/0212526 A1* | 7/2020 | Wu | H01M 50/30 |
| 2021/0016668 A1* | 1/2021 | Nakahara | H01M 10/6554 |
| 2021/0075075 A1 | 3/2021 | Kim et al. | |
| 2021/0113871 A1 | 4/2021 | Huang et al. | |
| 2022/0118861 A1 | 4/2022 | Zeng et al. | |
| 2022/0123430 A1 | 4/2022 | Liang et al. | |
| 2022/0311086 A1 | 9/2022 | Wu et al. | |
| 2023/0223650 A1 | 7/2023 | Zhao et al. | |

FOREIGN PATENT DOCUMENTS

| | | |
|---|---|---|
| CN | 205542977 U | 8/2016 |
| CN | 205583008 U | 9/2016 |
| CN | 106356579 A | 1/2017 |
| CN | 106450575 A | 2/2017 |
| CN | 106785182 A | 5/2017 |
| CN | 106960977 A | 7/2017 |
| CN | 206834290 U | 1/2018 |
| CN | 107910606 A | 4/2018 |
| CN | 107994175 A | 5/2018 |
| CN | 108075086 A | 5/2018 |
| CN | 207441811 U | 6/2018 |
| CN | 207474504 U | 6/2018 |
| CN | 207474524 U | 6/2018 |
| CN | 207886552 U | 9/2018 |
| CN | 207909930 U | 9/2018 |
| CN | 207967074 U | 10/2018 |
| CN | 207977389 U | 10/2018 |
| CN | 108922998 A | 11/2018 |
| CN | 109244349 A | 1/2019 |
| CN | 208478517 U | 2/2019 |
| CN | 208955153 U | 6/2019 |
| CN | 209071461 U | 7/2019 |
| CN | 209104233 U | 7/2019 |
| CN | 110148694 A | 8/2019 |
| CN | 209249563 U | 8/2019 |
| CN | 110212265 A | 9/2019 |
| CN | 209344171 U | 9/2019 |
| CN | 209401662 U | 9/2019 |
| CN | 209490404 U | 10/2019 |
| CN | 110459719 A | 11/2019 |
| CN | 209592146 U | 11/2019 |
| CN | 209662489 U | 11/2019 |
| CN | 209804782 U | 12/2019 |
| CN | 110868645 A | 3/2020 |
| CN | 110875443 A | 3/2020 |
| CN | 210403875 U | 4/2020 |
| CN | 111106276 A | 5/2020 |
| CN | 210535738 U | 5/2020 |
| CN | 210668459 U | 6/2020 |
| CN | 210723159 U | 6/2020 |
| CN | 211088371 U | 7/2020 |
| CN | 111509163 A | 8/2020 |
| CN | 111509326 A | 8/2020 |
| CN | 111584792 A | 8/2020 |
| CN | 111725454 A | 9/2020 |
| CN | 111742440 A | 10/2020 |
| CN | 211700415 U | 10/2020 |
| DE | 102011075318 A1 | 11/2012 |
| DE | 102011109249 A1 | 2/2013 |
| EP | 3333932 A1 | 6/2018 |
| EP | 3940860 A1 | 1/2022 |
| JP | H04349342 A | 12/1992 |
| JP | H06349521 A | 12/1994 |
| JP | 2008251263 A | 10/2008 |
| JP | 2010153141 A | 7/2010 |
| JP | 2012018766 A | 1/2012 |
| JP | 2012094313 A | 5/2012 |
| JP | 2014049427 A | 3/2014 |
| JP | 2014103051 A | 6/2014 |
| JP | 2014110138 A | 6/2014 |
| JP | 2015046354 A | 3/2015 |
| JP | 2017-152213 A | 8/2017 |
| JP | 2017139099 A | 8/2017 |
| JP | 2017147128 A | 8/2017 |
| JP | 2018018753 A | 2/2018 |
| JP | 2018045891 A | 3/2018 |
| JP | 2018116813 A | 7/2018 |
| JP | 2019029245 A | 2/2019 |
| JP | 2019149291 A | 9/2019 |
| WO | 2005114811 A2 | 12/2005 |
| WO | 2013017204 A1 | 2/2013 |
| WO | 2020204901 A1 | 10/2020 |

OTHER PUBLICATIONS

Office Action dated Aug. 16, 2023 received in U.S. Appl. No. 18/295,151.
International Search Report and Written Opinion dated Jul. 22, 2021 received in International Application No. PCT/CN2020/122001.
International Search Report and Written Opinion dated Jul. 21, 2021 received in International Application No. PCT/CN2020/121992.
International Search Report and Written Opinion dated Jul. 20, 2021 received in International Application No. PCT/CN2020/122000.
International Search Report and Written Opinion dated Jul. 20, 2021 received in International Application No. PCT/CN2020/121999.
Extended European Search Report dated Jul. 24, 2023 received in European Patent Application No. EP 20957979.6.
Extended European Search Report dated Apr. 7, 2022 received in European Patent Application No. EP 20827955.4.
Extended European Search Report dated Mar. 30, 2023 received in European Patent Application No. EP 20957981.2.
Notification to Grant Patent Right for Invention dated Dec. 7, 2020 received in Chinese Patent Application No. CN 202011121540.7.
First Office Action dated Dec. 7, 2020 received in Chinese Patent Application No. CN 202011121539.4.
First Office Action dated Jun. 14, 2022 received in Chinese Patent Application No. CN 202011121541.1.
First Office Action dated Jan. 11, 2022 received in Chinese Patent Application No. CN 202110210133.1.
Notice of Reasons for Refusal dated Sep. 4, 2023 received in Japanese Patent Application No. JP 2022-544802.
Extended European Search Report dated Dec. 11, 2023 received in European Patent Application No. EP 20957980.4.
Office Action dated Mar. 13, 2024 received in U.S. Appl. No. 18/175,248.
Notice of Reasons for Refusal dated Mar. 14, 2024 received in Japanese Patent Application No. JP 2023-509570.
Decision to Grant a Patent dated Mar. 4, 2024 received in Japanese Patent Application No. JP 2023-506541.
Notice of Reasons for Refusal dated Feb. 26, 2024 received in Japanese Patent Application No. JP 2023-506304.

(56) References Cited

OTHER PUBLICATIONS

Notice of Allowance dated Feb. 7, 2024 received in Korean Patent Application No. KR 10-2023-7001610.

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2020/121990, filed on Oct. 19, 2020, the disclosure of which is hereby incorporated by reference in its entirety.

TECHNICAL FIELD

Embodiments of the present application relate to the field of batteries, and in particular to a battery, a power consumption device, and a method and device for producing a battery.

BACKGROUND

Energy saving and emission reduction are the key to the sustainable development of the automotive industry. In this case, electric vehicles have become an important part of the sustainable development of the automotive industry due to their advantages of energy saving and environmental-friendliness. For the electric vehicles, the battery technology is an important factor for their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

Embodiments of the present application provide a battery, a power consumption device, and a method and device for producing a battery, which could enhance the safety of the battery.

In a first aspect, a battery is provided, and the battery includes: a battery cell including a pressure relief mechanism configured to be actuated when an internal pressure or temperature of the battery cell reaches a threshold, to relieve the internal pressure; and a fire-fighting pipeline configured to accommodate a fire-fighting medium and discharge the fire-fighting medium when the pressure relief mechanism is actuated; where the fire-fighting pipeline is covered with an isolation layer, and the isolation layer is configured to block the contact of gases and the fire-fighting pipeline so as not to generate condensate.

A battery provided by an embodiment of the present application may include one or more battery cells, the battery cell is provided with a pressure relief mechanism, and the pressure relief mechanism may be actuated when an internal temperature or pressure of the battery cell exceeds a threshold, to relieve the internal pressure; a fire-fighting pipeline is provided above the pressure relief mechanism, and when the pressure relief mechanism is actuated, emissions discharged from the pressure relief mechanism may damage the fire-fighting pipeline, so that a fire-fighting medium accommodated in the fire-fighting pipeline flows out and flows to the battery cell, to lower a temperature of the battery cell; meanwhile, the fire-fighting pipeline is covered with an isolation layer, and the isolation layer may be configured to reduce the probability of forming condensate on the fire-fighting pipeline, thereby reducing or even eliminating the influence of the condensate on the battery and improving the safety of the battery.

In some embodiments, the battery further includes a bus component including a bus unit and a bus connection port; where the bus unit is configured to implement electrical connection of a plurality of battery cells, and the bus connection port is configured to output electric energy of the plurality of battery cells; and the fire-fighting pipeline is covered with the isolation layer in a region corresponding to the bus connection port.

In an embodiment of the present application, the fire-fighting pipeline is covered with the isolation layer in a region corresponding to the bus connection port, so as to reduce the probability of forming condensate in the region corresponding to the bus connection port, and reduce or even eliminate the influence of the condensate on the electrical performance of the bus connection port. In addition, the isolation layer may also be configured to prevent short-circuit and ignition problems caused by overlapping of the fire-fighting pipeline and an electrical connecting member connected to the bus connection port, so as to improve the safety of the battery.

In some embodiments, the battery further includes a sensing component including a sensing unit, a transmission line, and a sensing port; where the sensing unit is configured to sense states of the plurality of battery cells, and the sensing port is configured to output state signals of the plurality of battery cells through the transmission line; and the fire-fighting pipeline is covered with the isolation layer in a region corresponding to the sensing port.

In an embodiment of the present application, the fire protection pipeline is covered with the isolation layer in a region corresponding to the sensing port, so as to reduce the probability of forming condensate in the region corresponding to the sensing port, reduce or even eliminate the influence of the condensate on the electrical performance of the sensing port, and improve the safety of the battery.

In some embodiments, the bus connection port, and the sensing port of the sensing component are located on a same side of the plurality of battery cells.

In an embodiment of the present application, a region of the fire-fighting pipeline corresponding to the bus connection port and a region of the fire-fighting pipeline corresponding to the sensing port may be the same or similar regions. Therefore, compared with the case where the region of the fire-fighting pipeline corresponding to the bus connection port and the region of the fire-fighting pipeline corresponding to the sensing port are different regions, in the technical solution adopting the embodiment of the present application, the fire-fighting pipeline only needs to be covered with an isolation layer in the same region instead of a plurality of different regions, which could reduce or even eliminate the influence of the condensate on the bus connection port and the sensing port. Under the premise of ensuring the safety performance of the battery, the use amount of the isolation layer can be reduced, which could not only reduce the cost, but also enable the fire-fighting pipeline to play a better cooling and temperature reduction role.

In some embodiments, the fire-fighting pipeline includes a plurality of first portions and at least one second portion, the plurality of first portions are disposed parallel to each other and extend along a stacking direction of the plurality of battery cells, and each second portion of the at least one second portion is connected to end portions of two adjacent first portions among the plurality of first portions; where the plurality of first portions are disposed on a side of a plurality of pressure relief mechanisms of the plurality of battery cells away from an interior of the plurality of battery cells.

In some embodiments, the sensing port of the sensing component of the battery is disposed in a region corresponding to an end portion of the first portion.

In some embodiments, the bus connection port of the bus component is disposed at a side of the sensing port of the sensing component of the battery.

In some embodiments, at least a partial region of the second portion is covered with the isolation layer.

In an embodiment of the present application, at least a partial region of the second portion connected to the end portion of the first portion is covered with the isolation layer, so as to reduce or even eliminate the influence of condensate formed on the second portion on a sensing interface and/or the bus connection port.

In some embodiments, an orthographic projection of a region covered with the isolation layer in the second portion in a first plane and an orthographic projection of the plurality of battery cells in the first plane do not overlap each other, where the first plane is a plane perpendicular to a height direction of the plurality of the battery cells.

In an embodiment of the present application, the fire-fighting pipeline may be closely disposed above the plurality of battery cells, so that a distance between the fire-fighting pipeline and the plurality of battery cells is reduced, thereby improving the cooling and temperature reduction effect of the fire-fighting pipeline on the plurality of battery cells.

In some embodiments, a fire-fighting medium inlet or a fire-fighting medium outlet of the fire-fighting pipeline is connected to the first portion, and a connection region of the first portion and the fire-fighting medium inlet or fire-fighting medium outlet is covered with the isolation layer.

In an embodiment of the present application, the fire-fighting medium inlet or fire-fighting medium outlet connected to the end portion of the first portion is covered with the isolation layer, which reduces or even eliminates the influence of condensate formed on the fire-fighting medium inlet or fire-fighting medium outlet on a sensing interface and/or the bus connection port.

In some embodiments, the first portion is not covered with the isolation layer, and the first portion is configured to cool the plurality of battery cells.

In an embodiment of the present application, the first portion is not covered with the isolation layer, and the first portion that is not covered with the isolation layer may be configured to cool and lower the temperature of the battery cell.

In some embodiments, the isolation layer is made of a non-water absorbent material.

In an embodiment of the present application, if the fire-fighting medium in the fire-fighting pipeline is a fire-fighting liquid and the isolation layer is made of a non-water absorbent material, it prevents the isolation layer from absorbing the fire-fighting liquid after the fire-fighting pipeline discharges the fire-fighting liquid so that the cooling effect is not affected, thereby reducing the probability of introducing the liquid at the isolation layer, and reducing the influence of the liquid on the battery cell and other electrical structures in the battery.

In some embodiments, the isolation layer is closed-cell foam, and cells in the closed-cell foam are all closed cells.

In an embodiment of the present application, the isolation layer is closed-cell foam, and cells in the closed-cell foam are all closed cells, which have the advantages of excellent impact resistance, resilience, flexibility, thermal insulation, water resistance, vapor resistance, and the like, and are convenient to be covered on fire-fighting pipeline.

In some embodiments, the isolation layer is configured to isolate the fire-fighting pipeline from the bus component.

In some embodiments, the battery further includes: an insulating dielectric layer disposed between the fire-fighting pipeline and the battery cell.

In some embodiments, a thickness of the isolation layer is greater than 1 mm.

In an embodiment of the present application, a thickness of the isolation layer is greater than 1 mm, to ensure good thermal insulation performance. Further, if the isolation layer is closed-cell foam with a thickness greater than 1 mm, it can play a buffering role when the fire-fighting pipeline is subjected to shock and collides with other components in the battery.

In a second aspect, a power consumption device is provided, including the battery according to the first aspect or any one of the embodiments of the first aspect.

In some embodiments, the power consumption device is a vehicle, a ship or a spacecraft.

In a third aspect, a method for producing a battery is provided, including providing a battery cell, the battery cell including a pressure relief mechanism configured to be actuated when an internal pressure or temperature of the battery cell reaches a threshold, to relieve the internal pressure; and providing a fire-fighting pipeline, the fire-fighting pipeline being configured to accommodate a fire-fighting medium and discharge the fire-fighting medium when the pressure relief mechanism is actuated; and where the fire-fighting pipeline is covered with an isolation layer, and the isolation layer is configured to block the contact of gases and the fire-fighting pipeline so as not to generate condensate.

In some embodiments, the method further includes: providing a bus component, the bus component including a bus unit and a bus connection port; where the bus unit is configured to implement electrical connection of a plurality of battery cells, and the bus connection port is configured to output electric energy of the plurality of battery cells; and the fire-fighting pipeline is covered with the isolation layer in a region corresponding to the bus connection port.

In some embodiments, the method further includes: providing a sensing component, the sensing component including a sensing unit, a transmission line and a sensing port; where the sensing unit is configured to sense states of the plurality of battery cells, and the sensing port is configured to output state signals of the plurality of battery cells through the transmission line; and the fire-fighting pipeline is covered with the isolation layer in a region corresponding to the sensing port.

In some embodiments, an orthographic projection of a region covered with the isolation layer in the fire-fighting pipeline in a first plane and an orthographic projection of the plurality of battery cells in the first plane do not overlap each other, where the first plane is a plane perpendicular to a height direction of the plurality of the battery cells.

In some embodiments, the isolation layer is made of a non-water absorbent material.

In a fourth aspect, a device for producing a battery is provided, including a module for executing the method provided in the foregoing third aspect.

BRIEF DESCRIPTION OF THE DRAWINGS

The drawings described herein are used to provide a further understanding of the present application and form a part of the present application. The illustrative embodiments of the present application and the description thereof are used to explain the present application and are not intended to limit the present application. In the drawings.

DESCRIPTION OF EMBODIMENTS

Figure 1:
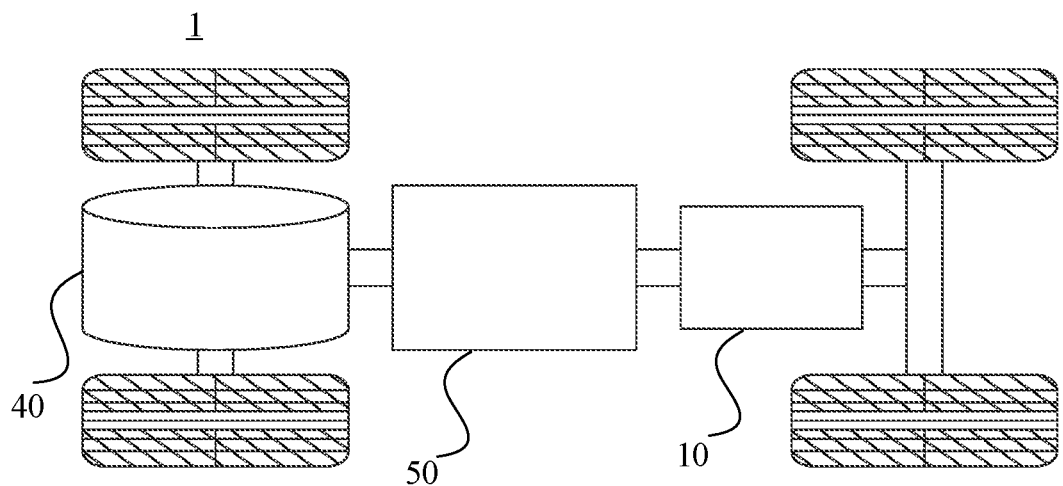
FIG. 1 is a schematic diagram of a vehicle according to an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid or in another shape, which is not limited by the embodiment of the present application. The battery cells are generally divided into three types according to the way of packaging: cylindrical battery cells, prismatic battery cells and pouch battery cells, which is not limited by the embodiment of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a case for enclosing one or more battery cells. The case can prevent a liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum, and the positive active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a winding structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated when an internal pressure or temperature of the battery cell reaches a predetermined threshold, to relieve the internal pressure or temperature. The threshold design is different according to different design requirements. The threshold may depend on the material of one or more of the positive electrode sheet, the negative electrode sheet, the electrolytic solution and the isolation film in the battery cell. The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell can be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the isolation film, high-temperature and high-pressure gases generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. The high-temperature and high-pressure emissions are discharged along a direction of the pressure relief mechanism provided in the battery cell, and more specifically, may be discharged along a direction of a region where the pressure relief mechanism is actuated. The strength and destructive power of such emissions may be great, or may even be enough to break through one or more structures along this direction, causing safety problems. In addition, after thermal runaway occurs inside the battery cell, high pressure and high heat inside the battery cell may continue to be generated, resulting in continuous potential safety hazards.

In view of the foregoing problems, a fire-fighting system may be disposed inside a case of a battery, and a fire-fighting pipeline of the fire-fighting system is disposed above a wall of a battery cell provided with a pressure relief mechanism. When the pressure relief mechanism is actuated, the fire-fighting pipeline discharges a fire-fighting medium, thereby lowering a temperature of the emissions discharged from the pressure relief mechanism and reducing the risk resulting from the emissions; and the fire-fighting medium may further flow through the actuated pressure relief mechanism to the interior of the battery cell, thereby further lowering a temperature of the battery cell and enhancing the safety of the battery. For example, the emissions discharged from the battery cell when the pressure relief mechanism is actuated may be used to damage the fire-fighting pipeline, so that the fire-fighting medium in the fire-fighting pipeline is discharged.

The fire-fighting pipeline in an embodiment of the present application is configured to accommodate a fire-fighting medium, the fire-fighting medium here may be a fluid, and the fluid may be a liquid or gas. In the case where the pressure relief mechanism does not damage the fire-fighting pipeline, the fire-fighting pipeline may not accommodate any substance, but in the case where the pressure relief mechanism is actuated, the fire-fighting medium may be accommodated in the fire-fighting pipeline, for example, the fire-fighting medium may be controlled to enter the fire-fighting pipeline by opening and closing a valve. Or, in the case where the pressure relief mechanism is not damaged, the fire-fighting medium may always be accommodated in the fire-fighting pipeline, and the fire-fighting medium may also be used for adjusting the temperature of the battery cell. Temperature adjustment means heating or cooling a plurality of battery cells. In the case of cooling or lowering the temperature of the battery cells, the fire-fighting pipeline is configured to accommodate a cooling fluid to lower the temperature of the plurality of battery cells. In this case, the fire-fighting pipeline may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas. Optionally, the fire-fighting medium can flow in a circulating manner to achieve better temperature adjustment effects. Optionally, the fire-fighting medium may be water, a mixture of water and ethylene glycol, or air, etc.

When a battery is in a high-temperature and high-humidity environment, condensate is likely to be produced in a case of the battery, causing safety hazards and affecting the safety of the battery. Specifically, when high-temperature and high-humidity gases in the battery encounter a component with a lower temperature, such as a fire-fighting pipeline in the case of the battery, condensate will be produced. If the condensate drips into an electrical connection region in the battery, the safety of the battery may be affected.

In view of this, the present application provides a technical solution in which a component with a lower temperature in the battery, such as a fire-fighting pipeline is covered with an isolation layer, to isolate gases from the fire-fighting pipeline. In this way, the probability of forming condensate on the fire-fighting pipeline could be reduced, thereby reducing or even eliminating the influence of the condensate on an electrical connection region or other electrical regions in the battery. Therefore, the safety of the battery could be enhanced.

In addition to the battery cell and fire-fighting pipeline mentioned above, the case of the battery may also include a thermal management component, a bus component and other components of the battery. In some embodiments, a structure configured to fix the battery cells may also be provided in the case. The shape of the case may be determined according to the plurality of battery cells accommodated therein. In some embodiments, the case may be a cube with six walls.

The thermal management component is configured to accommodate a fluid to adjust the temperatures of the plurality of battery cells. The fluid here may be a liquid or gas, and temperature adjustment means heating or cooling the plurality of battery cells. In the case of cooling or lowering the temperature of the battery cells, the thermal management component is configured to accommodate a cooling fluid to lower the temperature of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component may also be configured for heating to raise the temperature of the plurality of battery cells, which is not limited by the embodiment of the present application. Optionally, the fluid may flow in a circulating manner to achieve better temperature adjustment effects. Optionally, the fluid may be water, a mixture of water and ethylene glycol, or air, etc.

The bus component is configured to implement the electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Corresponding to the "high-voltage chamber", the electrical connection formed by the bus component may also be called "high-voltage connection".

In addition to the bus component, a sensing device for sensing a state of the battery cell may also be provided in the battery. In an embodiment of the present application, the electrical connection in the battery may include electrical connection formed by the bus component and/or electrical connection in the sensing device.

A pressure balancing mechanism may also be disposed on the case of the battery and configured to balance the pressure inside and outside the case. For example, when the pressure inside the case is higher than that outside the case, the gas inside the case may flow to the outside of the case through the pressure balancing mechanism; and when the pressure inside the case is lower than that outside the case, the gas outside the case may flow to the inside of the case through the pressure balancing mechanism.

It should be understood that each component in the case of the battery described above should not be construed as a limitation of the embodiment of the present application, that is, the case of the battery according to the embodiment of the present application may or may not include the foregoing components.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing devices, but also applicable to all devices using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 50 and a battery 10 may be provided inside the vehicle 1, and the controller 50 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
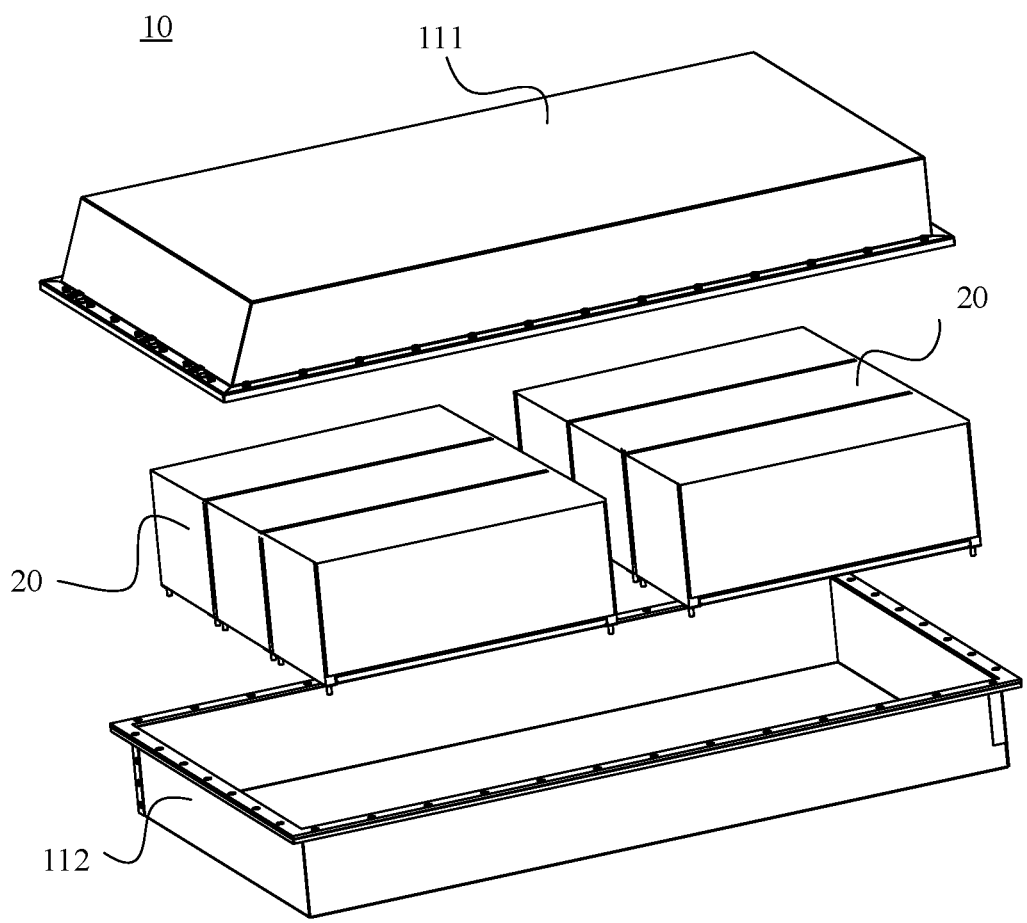
FIG. 2 is a schematic structural diagram of a battery according to an embodiment of the present application.

As shown in FIG. 2, the case may include two portions, which are respectively referred to as a first portion of a case 111 and a second portion of a case 112, and the first portion of the case 111 and the second portion of the case 112 are fastened together. The shapes of the first portion of the case 111 and the second portion of the case 112 may be determined according to the shape of the combined plurality of battery cells 20, and the first portion of the case 111 and the second portion of the case 112 may each have an opening. For example, the first portion of the case 111 and the second portion of the case 112 each may be a hollow cuboid and each have only one surface with an opening, and the opening of the first portion of the case 111 is arranged opposite to the opening of the second portion of the case 112. The first portion of the case 111 and the second portion of the case 112 are fastened to each other to form a case with a closed chamber. The plurality of battery cells 20 are combined in parallel connection or series connection or series-parallel connection and are then placed in the case formed by fastening the first portion of the case 111 to the second portion of the case 112.

Optionally, the battery 10 may also include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

Figure 3:
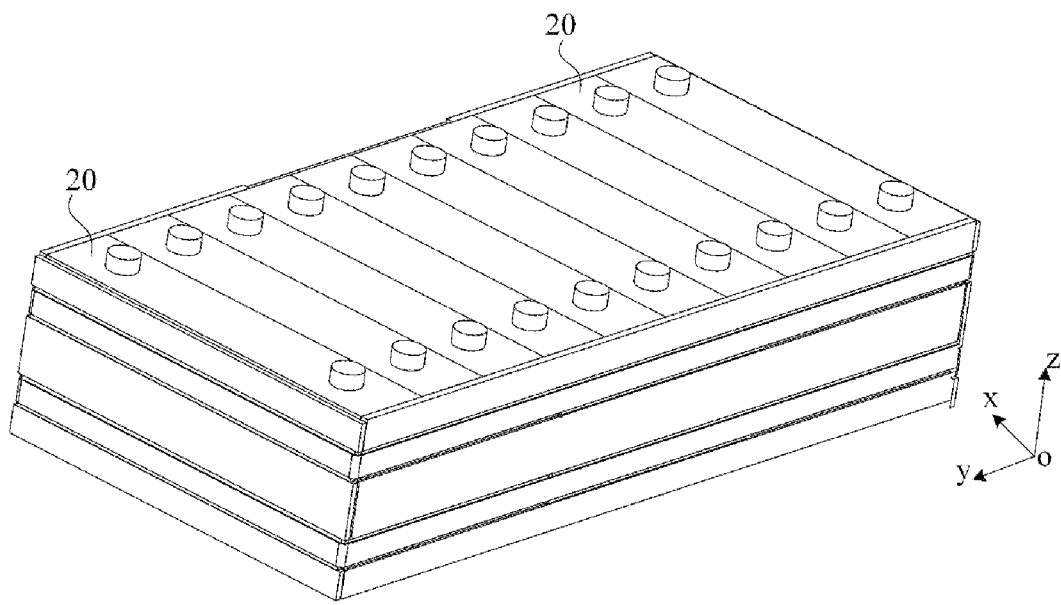
FIG. 3 is a schematic structural diagram of a battery module according to an embodiment of the present application.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel. In FIG. 3, the x direction is a width direction of the battery module, they direction is a length direction of the battery module, and the z direction is a height direction of the battery module.

Figure 4:
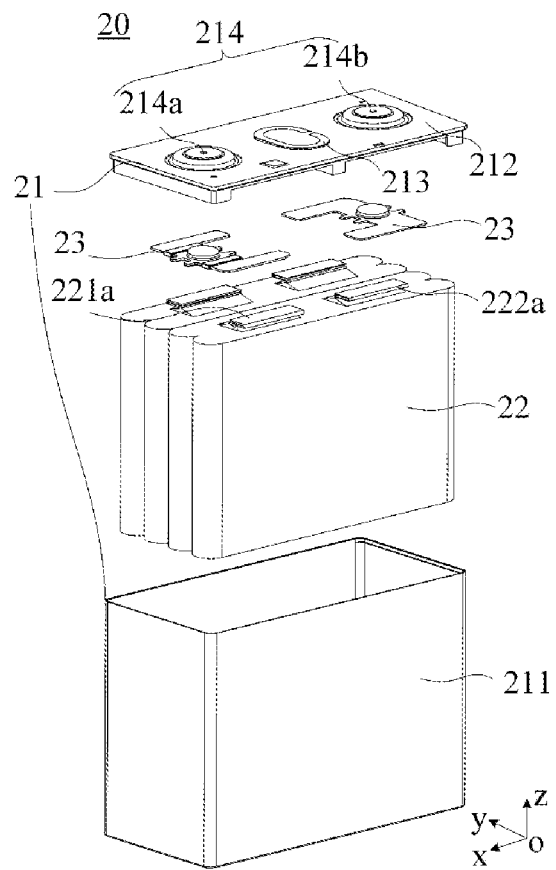
FIG. 4 is an exploded view of a battery cell according to an embodiment of the present application.

FIG. 4 is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, and the second electrode tab 222a of one or more electrode assemblies 22 is connected to the other electrode terminal via the other connecting member 23. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

A pressure relief mechanism 213 may also be provided on the battery cell 20. The pressure relief mechanism 213 is configured to be actuated when an internal pressure or temperature of the battery cell 20 reaches a threshold, to relieve the internal pressure or temperature. The pressure relief mechanism 213 may have various possible pressure relief structures, which is not limited by the embodiment of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Figure 5:
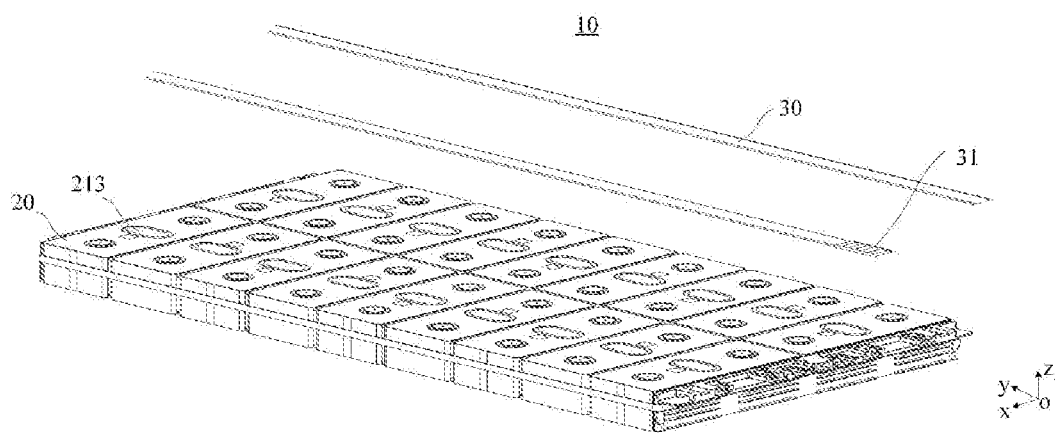
FIG. 5 is a schematic exploded view of a battery according to an embodiment of the present application.

FIG. 5 shows a schematic exploded view of a battery 10 according to an embodiment of the present application. As shown in FIG. 5, the battery 10 may include a battery cell 20 and a fire-fighting pipeline 30. The battery cell 20 includes the foregoing pressure relief mechanism 213, and the pressure relief mechanism 213 is configured to be actuated when an internal pressure or temperature of the battery cell 20 reaches a threshold, to relieve the internal pressure.

As an example, the battery 10 may include at least one battery cell 20, for example, in FIG. 5, the case where the battery 10 includes 2×9 battery cells 20 is taken as an example. For any battery cell 20, the battery cell 20 may include the foregoing pressure relief mechanism 213.

Optionally, the pressure relief mechanism 213 may be disposed at any position of the battery cell 20. If the battery cell 20 is a cuboid as shown in FIG. 5, the pressure relief mechanism 213 may be disposed on any one wall of the cuboid. For example, the pressure relief mechanism 213 may be disposed on the uppermost wall of each battery cell 20 in FIG. 5, that is, the pressure relief mechanism 213 and an electrode terminal of the battery cell 20 may be disposed on the same wall.

The fire-fighting pipeline 30 is configured to accommodate a fire-fighting medium and discharge the fire-fighting medium when the pressure relief mechanism 213 is actuated; where the fire-fighting pipeline 30 is covered with an isolation layer 31, and the isolation layer 31 is configured to block the contact of gases and the fire-fighting pipeline 30 so as not to generate condensate.

Specifically, when the pressure relief mechanism 213 is actuated, the fire-fighting pipeline 30 discharges the fire-fighting medium, thereby lowering a temperature of emissions discharged from the pressure relief mechanism 213 and reducing the risk resulting from the emissions; and the fire-fighting medium may further flow through the actuated pressure relief mechanism 213 to an interior of the battery cell 20, thereby further lowering a temperature of the battery cell 20 and enhancing the safety of the battery. Optionally, the fire-fighting medium may also be called a cooling medium or cooling fluid, and more specifically, may be called a fire-fighting liquid or fire-fighting gas. In addition, optionally, the fire-fighting medium can flow in a circulating manner to achieve better temperature adjustment effects. In some embodiments, the fire-fighting medium may be water, a mixture of water and ethylene glycol, or air, etc.

Optionally, the fire-fighting pipeline 30 in the embodiment of the present application may be set to be any shape according to practical applications. For example, a cross-sectional shape of the fire-fighting pipeline 30 may be set to be any shape according to practical applications. Considering space utilization and convenience for installation, the fire-fighting pipeline 30 may be set as a flat pipeline as shown in FIG. 5, or may be set to be other shapes, such as a cylindrical pipeline. For ease of description, the shape shown in FIG. 5 is taken as an example for description in the embodiment of the present application.

Furthermore, as shown in FIG. 5, the foregoing fire-fighting pipeline 30 is covered with the isolation layer 31, and the isolation layer 31 is configured to block the contact of gases and the fire-fighting pipeline 30 so as not to generate condensate, thereby reducing the influence of the condensate on the battery cell 20, the electrical connection region and other electrical structures in the battery 10.

Therefore, the battery 10 of the embodiment of the present application may include one or more battery cells 20, the battery cell 20 is provided with a pressure relief mechanism 213, and the pressure relief mechanism 213 may be actuated when an internal temperature or pressure of the battery cell 20 exceeds a threshold, to relieve the internal pressure; a fire-fighting pipeline 30 is provided above the pressure relief mechanism 213, and when the pressure relief mechanism 213 is actuated, a fire-fighting medium accommodated in the fire-fighting pipeline 30 flows out and flows to the battery cell 20, to lower a temperature of the battery cell 20; meanwhile, the fire-fighting pipeline 30 is covered with an isolation layer 31, and the isolation layer 31 may be configured to reduce the possibility of forming condensate on the fire-fighting pipeline 30, thereby reducing the influence of the condensate on the battery and improving the safety of the battery 10.

Optionally, except that the isolation layer 31 may be configured to separate the gases from the fire-fighting pipeline 30, a material of the isolation layer 31 may also be a thermal insulation material with a low thermal conductivity, and an ambient temperature and a temperature of the fire-fighting pipeline 30 have little influence on it, and high-temperature and high-humidity gases are unlikely to form condensate on a surface of the isolation layer 31.

In some embodiments, if the fire-fighting medium in the fire-fighting pipeline 30 is a fire-fighting liquid and the isolation layer 31 may be made of a non-water absorbent material, it prevents the isolation layer 31 from absorbing the fire-fighting liquid after the fire-fighting pipeline 30 discharges the fire-fighting liquid so that the cooling effect is not affected, thereby reducing the probability of introducing the liquid at the isolation layer 31, and reducing the influence of the liquid on the battery cell 20 and other electrical structures in the battery 10.

As an example, the foregoing isolation layer 31 may be closed-cell foam, and cells in the closed-cell foam are all closed cells, which have the advantages of excellent impact resistance, resilience, flexibility, thermal insulation, water resistance, and the like, and are convenient to be covered on fire-fighting pipeline 30.

As an example, a thickness of the foregoing isolation layer 31 may be greater than 1 mm, to ensure good thermal insulation performance. Further, if the isolation layer 31 is closed-cell foam with a thickness greater than 1 mm, it can play a buffering role when the fire-fighting pipeline 30 is subjected to shock and collides with other components in the battery 10.

It can be understood that the insulation layer 31 may be other insulation materials with thermal insulation, non-water absorption and other characteristics other than closed-cell foam, and the thickness of the insulation layer 31 may also be designed according to actual requirements. The specific type and thickness of the insulation layer 31 are not limited in the embodiment of the present application.

Figure 6:
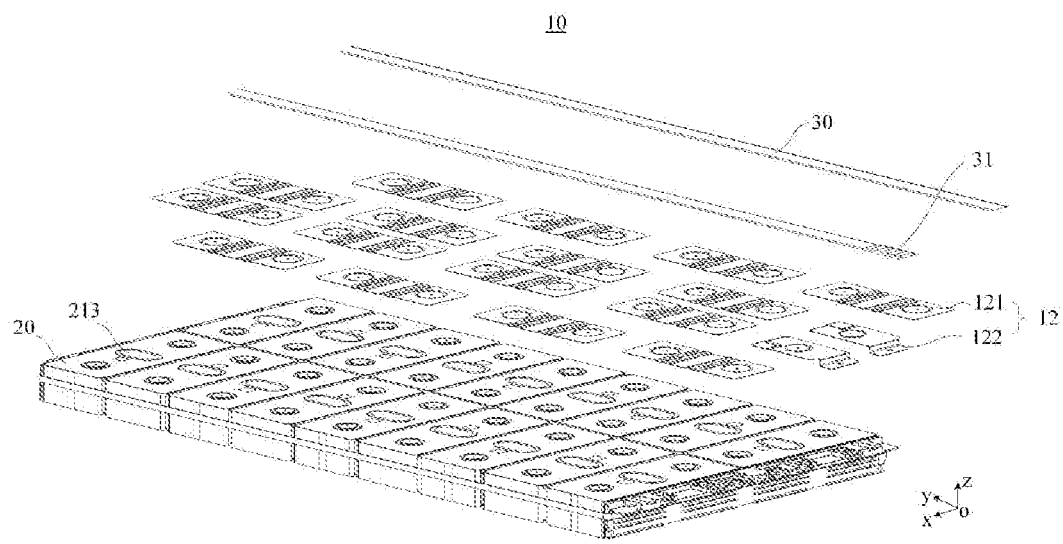
FIG. 6 is a schematic exploded view of a battery according to another embodiment of the present application.

FIG. 6 shows a schematic structural diagram of another battery 10 according to an embodiment of the present application.

As shown in FIG. 6, in an embodiment of the present application, the battery 10 further includes a bus component 12, and the bus component 12 includes a bus unit 121 and a bus connection port 122.

Specifically, the bus component 12 includes a plurality of bus units 121, and the plurality of bus units 121 are configured to implement electrical connection of a plurality of battery cells 20 in the battery 10, and each bus unit 121 in the plurality of bus units 121 is configured to implement electrical connection of adjacent battery cells 20. Specifically, each bus unit 121 may implement electrical connection of the battery cells 20 by connecting electrode terminals of the adjacent battery cells 20.

In addition, the bus component 12 further includes a plurality of bus connection ports 122, and the plurality of bus connection ports 122 are configured to output electric energy of the plurality of battery cells 20 in the battery 10.

It should be noted here that, in an embodiment of the present application, the plurality of bus connection ports 122 are at least one group of bus connection ports 122, and each group of bus connection ports 122 includes a positive connection port and a negative connection port for outputting electric energy of a group of battery cells 20 in the battery 10. For ease of description, the group of battery cells 20 corresponding to the group of bus connection ports 122 may be referred to as a battery cell group. The battery 10 may include one or more battery cell groups, that is, it may correspondingly include one or more groups of bus connection ports 122. If the battery 10 includes a plurality of battery cell groups, a plurality groups of bus connection ports 122 are connected to each other through an electrical connecting member to form an electrical energy output port of the battery 10.

As an example, as shown in FIG. 6, in one embodiment, the battery 10 includes two bus connection ports 122, that is, a group of bus connection ports 122, and a plurality of battery cells 20 in the battery 10 are a battery cell group. The two bus connection ports 122 may be located on the same side of the battery cell group. Further, in the group of bus connection ports 122, a positive connection port and a negative connection port may be disposed adjacent to each other for outputting electric energy of the battery cell group.

In the embodiment of the present application, the fire-fighting pipeline 30 is covered with an isolation layer 31 in a region corresponding to the foregoing bus connection port 122, so as to reduce the probability of forming condensate in the region corresponding to the bus connection port 122, and to reduce or even eliminate the influence of the condensate on the electrical performance of the bus connection port 122. In addition, the isolation layer 31 may also be configured to prevent short-circuit and ignition problems caused by overlapping of the fire-fighting pipeline 30 and the electrical connecting member connected to the bus connection port 122, so as to further improve the safety of the battery 10.

It can be understood that the foregoing bus connection port 122 is configured to output the electric energy of the plurality of battery cells 20 in the battery 10. If condensate is formed on the bus connection port 122, on one hand, the transmission of electric energy of the bus connection port 122 will be affected; on the other hand, the condensate is also likely to corrode the bus connection port 122 which is made of metal and the electrical connecting member between the bus connection ports 122, thereby further affecting the electrical performance of the bus connection port 122.

In addition, if the condensate is formed between the two bus connection ports 122, and the potential difference between the two bus connection ports 122 is large, the condensate will cause a short circuit between the two bus connection ports 122, a large current and a large amount of heat are generated in the plurality of battery cells 20, which causes damage to the battery cell 20 and even an explosion, and causes a safety incident.

As an example, in an embodiment of the present application, in the battery cell 20, the pressure relief mechanism 213 and the electrode terminal 214 are located on a first wall of the battery cell 20. It can be understood that the first walls of the plurality of battery cells 20 are located on the same plane. For ease of description, hereinafter, a face where the first walls of the plurality of battery cells 20 are located is referred to as a first face of the plurality of battery cells 20.

Optionally, if the bus component 12 shown in FIG. 6 is installed on the plurality of battery cells 20, the bus units 121 for connecting the electrode terminals of the plurality of battery cells 20 in the bus component 12 may be located on the first face. Further, the bus connection port 122 may be located at an edge of the first face, for example, at one side of the first face, and in order to facilitate the connection with the electrical connecting member, the bus connection port 122 may be formed into a bending structure, including a first plate on the first face and a second plate perpendicular to the first plate.

Optionally, the fire-fighting pipeline 30 may be disposed above the bus component 12, that is, above the first face. When the fire-fighting pipeline 30 is damaged by the emissions discharged from the pressure relief mechanism 213, the fire-fighting medium therein may be discharged under the action of gravity to cool and lower the temperature of the emissions of the pressure relief mechanism 213.

In an embodiment of the present application, if the bus connection port 122 is located on a certain side of the first face, a region of the fire-fighting pipeline 30 corresponding to the bus connection port 122 includes, but is not limited to, a region of the fire-fighting pipeline 30 above the certain side, and a distance between the region of the fire-fighting pipeline 30 corresponding to the bus connection port 122 and the bus connection port 122 is relatively short.

Since the distance between the region of the fire-fighting pipeline 30 corresponding to the bus connection port 122 and the bus connection port 122 is relatively short, if condensate is formed in the corresponding region, the condensate is likely to drip to the bus connection port 122, thereby affecting the electrical performance of the bus connection port 122. Therefore, first of all, the corresponding region is required to be covered with the isolation layer 31 to reduce the probability of forming the condensate.

Figure 7:
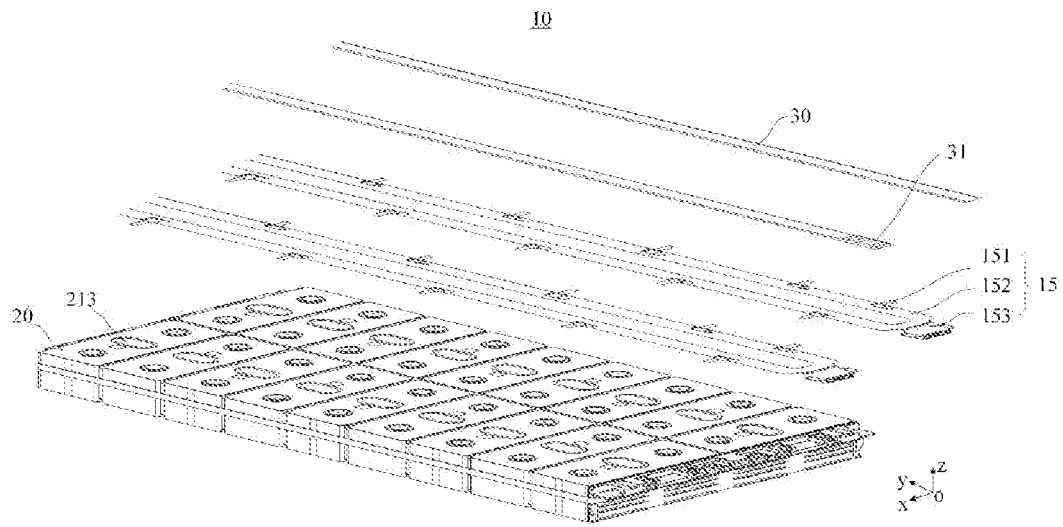
FIG. 7 is a schematic exploded view of a battery according to another embodiment of the present application.

As an example, FIG. 7 shows a schematic structural diagram of another battery 10 according to an embodiment of the present application.

As shown in FIG. 7, in an embodiment of the present application, the battery 10 further includes a sensing component 15, and the sensing component 15 includes a sensing unit 151, a transmission line 152 and a sensing port 153.

The plurality of sensing units 151 are configured to sense states of the plurality battery cells 20. For example, the sensing unit 151 includes, but is not limited to, at least one sensor configured to sense state signals such as temperatures, voltages and currents of the plurality battery cells 20. The state signals of the plurality of battery cells 20 sensed by the sensing units 151 are transmitted through at least one transmission line 152, and the transmission line 152 may be, for example, an electrical signal transmission line or a circuit board, where the circuit board includes, but is not limited to, a flexible printed circuit (FPC) board, which is thin and easy to install. One end of the transmission line 152 is provided with the sensing port 153, and the sensing port 153 is configured to output the state signal transmitted in the transmission line 152.

Optionally, in the embodiment of the present application, the fire-fighting pipeline 30 is covered with the isolation layer 31 in a region corresponding to the sensing port 153.

As shown in FIG. 7, in the sensing component 15, the transmission line 152 is located above the first face where the pressure relief mechanisms 213 of the plurality of battery cells 20 are located. As an example, it may be similar to the bus connection port 122 in FIG. 6, and the sensing port 153 is disposed close to one side of the first face.

In an embodiment of the present application, if the sensing port 153 is disposed close to a certain side of the first face, a region of the fire-fighting pipeline 30 corresponding to the sensing port 153 includes, but is not limited to, a region of the fire-fighting pipeline 30 above the certain side, and a distance between the region of the fire-fighting pipeline 30 corresponding to the sensing port 153 and the sensing port 153 is relatively short.

Since the distance between the region of the fire-fighting pipeline 30 corresponding to the sensing port 153 and the sensing port 153 is relatively short, if condensate is formed in the corresponding region, the condensate is likely to drip to the bus connection port 122, thereby affecting the transmission of state signals of the plurality of battery cells 20 by the sensing port 153. Therefore, the corresponding region is required to be covered with the isolation layer 31 to reduce the probability of forming the condensate.

In some embodiments, the sensing port 153 in the sensing component 15 and the bus connection port 122 in the bus component 12 mentioned above are located on the same side of the plurality of battery cells 20.

For example, in foregoing FIGS. 6 and 7, the sensing port 153 in the sensing component 15 and the bus connection port 122 in the bus component 12 are disposed on the same side close to the first face. In this case, the region of the fire-fighting pipeline 30 corresponding to the bus connection port 122 and the region of the fire-fighting pipeline 30 corresponding to the sensing port 153 may be the same or similar regions.

Therefore, compared with the case where the region of the fire-fighting pipeline 30 corresponding to the bus connection port 122 and the region of the fire-fighting pipeline 30 corresponding to the sensing port 153 are different regions, in the technical solution adopting the embodiment of the present application, the fire-fighting pipeline 30 only needs to be covered with the isolation layer 31 in the same region instead of a plurality of different regions, which could reduce or even eliminate the influence of condensate on the bus connection port 122 and the sensing port 153. Under the premise of ensuring the safety performance of the battery 10, the use amount of the insulation layer 31 can be reduced, which could not only reduce the cost, but also increase an area of a region that is not covered with the insulation layer 31 in the fire-fighting pipeline 30, so that the fire-fighting pipeline 30 can play a better role in temperature adjustment.

In some embodiments, the battery 10 further includes an insulating dielectric layer, which is disposed between the foregoing fire-fighting pipeline 30 and the battery cell 20.

Optionally, when the pressure relief mechanism 213 of the battery cell 20 is actuated, a local area of the insulating dielectric layer covered above the pressure relief mechanism 213 can be quickly melted by the emissions discharged from the pressure relief mechanism 213, to relieve the internal temperature and pressure of the battery cell 20. Therefore, a melting point of the material of the insulating dielectric layer at the position of the pressure relief mechanism 213 is generally low.

In the embodiment of the present application, the insulating dielectric layer is configured for insulation between the wall where the pressure relief mechanism 213 of the battery cell 20 is located and the fire-fighting pipeline 30. Considering that a plurality of battery cells 20 may be provided in the battery 10, when a large number of battery cells 20 are provided, the plurality of battery cells 20 can correspond to the insulating dielectric layer with a larger area, which is convenient for installing them to the battery 10.

Optionally, the battery 10 may include two insulating dielectric layers for covering the bus unit 121 in the bus component 12 and/or the sensing unit 151 and the transmission line 152 in the sensing component 15 from above and from below, only leaving a space for the bus connection port 122 and the sensing port 153.

Optionally, a region of the fire-fighting pipeline 30 corresponding to the insulating dielectric layer may not be covered with the isolation layer 31. Even if the fire-fighting pipeline 30 forms condensate in this region, the insulating dielectric layer may be configured to insulate and isolate the condensate from the bus unit 121 and/or the sensing unit 151 and the transmission line 152 that are covered by the insulating dielectric layer. Further, the insulating dielectric layer may also be configured to insulate and isolate the condensate from the battery cell 20.

For ease of description, hereinafter, a structure formed by covering the bus unit 121, the sensing unit 151 and the transmission line 152 with the insulating dielectric layer is referred to as a transmission assembly.

Figure 8:
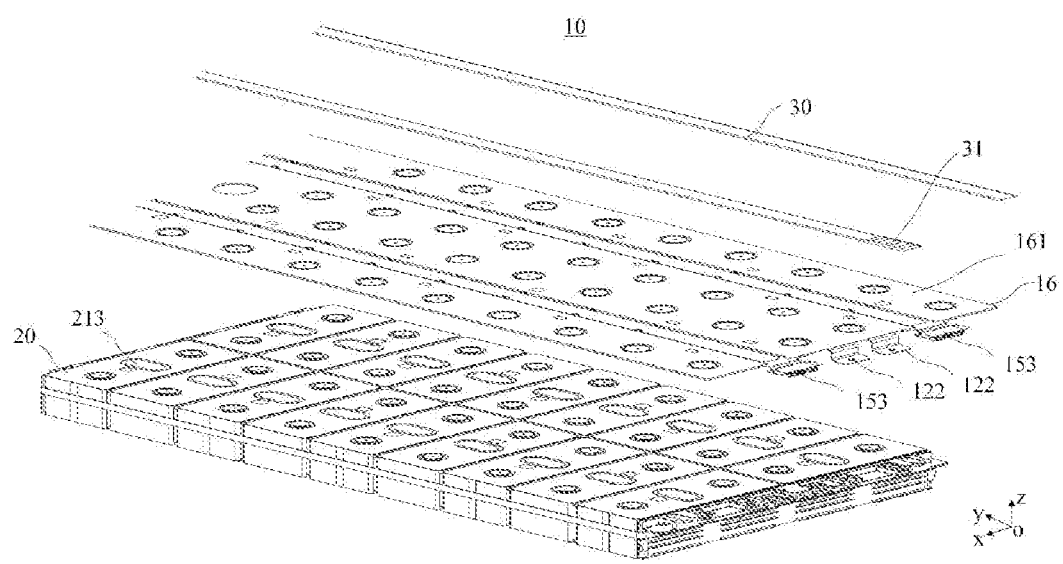
FIG. 8 is a schematic exploded view of a battery according to another embodiment of the present application.

As an example, FIG. 8 shows a schematic structural diagram of a transmission assembly 16, the transmission assembly 16 is disposed between a fire-fighting pipeline 30 and battery cells 20, and corresponds to 2×9 battery cells 20.

Optionally, the bus connection port 122 in the bus component 12 and the sensing port 153 in the sensing component 15 are located on the same side of the insulating dielectric layer 161. In some embodiments, as shown in FIG. 8, two sensing ports 153 are located on two sides of two bus connection ports 122, respectively.

In the embodiment of the present application, the bus unit 121 in the bus component 12 and the sensing unit 151 and the transmission line 152 in the sensing unit 15 mentioned above are covered with the insulating dielectric layer 161 to form the transmission assembly 16, and the fire-fighting pipeline 30 may not be covered with the isolation layer 31 in a region corresponding to the insulating dielectric layer 161, but may be covered with the isolation layer 31 in regions corresponding to the bus connection port 122 and the sensing port 153. Therefore, there is only a small area of region covered with the isolation layer 31 in the fire-fighting pipeline 30, which is used to reduce or even eliminate the influence of condensate on the bus connection port 122 and the sensing port 153, and the other regions thereof with a large area are not covered with the isolation layer 31, so that the fire-fighting pipeline 30 has a better cooling and temperature reduction effect. Therefore, according to the solution of the embodiment of the present application, the safety performance of the battery 10 can be further enhanced.

It can be understood that the foregoing transmission assembly 16 may include other structural components such as a bracket of the fire-fighting pipeline 30 in addition to the insulating dielectric layer 161, the bus component 12 and the sensing component 15 therein, and the specific structure of the transmission assembly 16 is not limited in the embodiment of the present application.

It can also be understood that in the embodiments shown in FIGS. 6 to 8, the case where the sensing port 153 in the sensing component 15 and the bus connection port 122 in the bus component 12 are located on the same side of the plurality of battery cells 20 is illustrated; and it can be understood that the sensing port 153 in the sensing component 15 and the bus connection port 122 in the bus component 12 can also be located on different sides of the plurality of battery cells 20, for example, the bus connection port 122 in the bus component 12 is located on a first side of the first face, and the sensing port 153 in the sensing component 15 is located on a second side opposite to the first side of the first face. The embodiment of the present application does not specifically limit the specific positions of the sensing port 153 and the bus connection port 122.

The positional relationship among the isolation layer 31 covered on the fire-fighting pipeline 30, the bus component 12 and the sensing component 15 in the present application is described above with reference to FIGS. 4 to 8. The design of the fire-fighting pipeline 30 and the position design of the isolation layer 31 in the fire-fighting pipeline 30 will be described below with reference to FIGS. 9 to 16.

Figure 9:
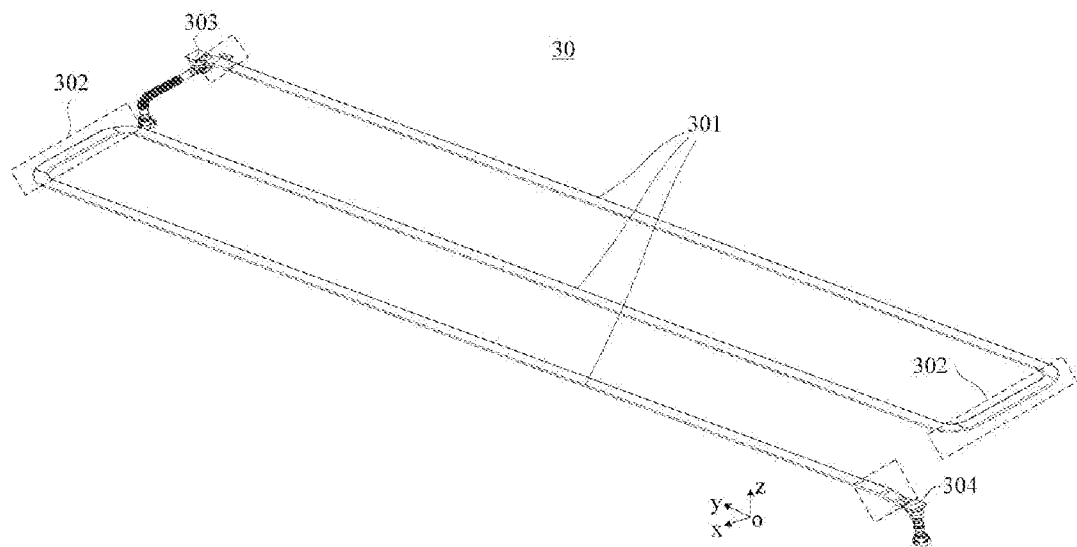
FIG. 9 is a structural diagram of a fire-fighting pipeline according to another embodiment of the present application.
Figure 10:
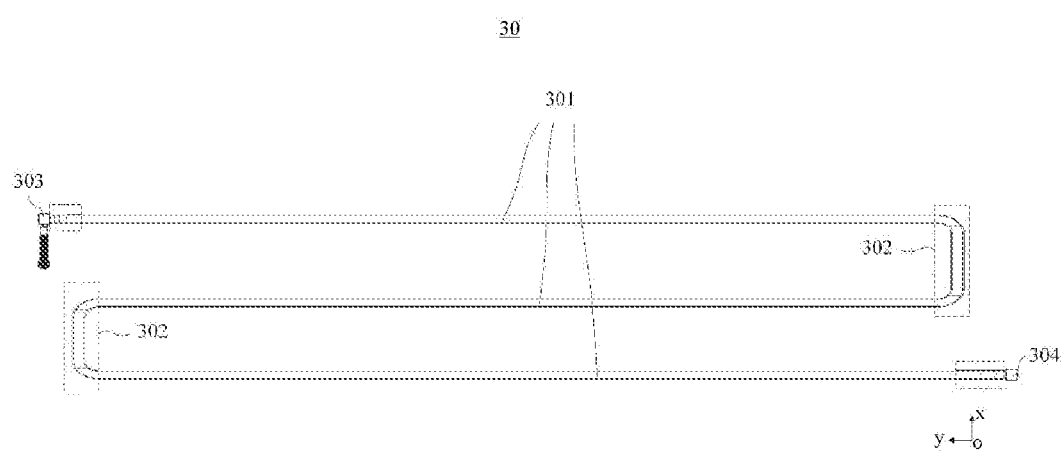
FIG. 10 is a schematic top view of the fire-fighting pipeline in FIG. 9.

FIG. 9 shows a schematic diagram of a three-dimensional structure of a fire-fighting pipeline 30 provided by an embodiment of the present application. FIG. 10 shows a top view of the fire-fighting pipeline 30 in FIG. 9.

Optionally, the fire-fighting pipeline 30 includes a plurality of first portions 301 and at least one second portion 302, the plurality of first portions 301 are disposed parallel to each other and extend along a stacking direction (the y direction as shown in the figure) of the plurality of battery cells 20, and each second portion 302 of the at least one second portion 302 is connected to end portions of two adjacent first portions among the plurality of first portions 301.

It should be noted that the plurality of first portions 301 may be approximately parallel, and two first portions 301 of the plurality of first portions 301 may have a small included angle, for example, the included angle may be within 5 degrees.

Optionally, the first portion 301 of the fire-fighting pipeline 30 may be a straight line pipeline, and the second portion 302 may be a U-shaped pipeline, a straight line pipeline, or pipelines in other shapes. For example, as shown in FIG. 10, the middle part of the second portion 302 is a straight line pipeline, and two ends of the straight line pipeline are connected with pipelines with filleted corners, which are used to connect the first portions 301. Of course, in addition to the foregoing examples, the first portion 301 and the second portion 302 may also be interconnected pipelines in other shapes, which is not specifically limited in the embodiment of the present application.

As an example, in the embodiments shown in FIGS. 9 and 10, the fire-fighting pipeline 30 includes three first portions 301 and two second portions 302. The fire-fighting pipeline 30 formed by the three first portions 301 and the two second portions 302 may be approximately an S-shaped pipeline.

Optionally, as shown in FIG. 9 and FIG. 10, a fire-fighting medium inlet 303 and a fire-fighting medium outlet 304 may further be included at both ends of the fire-fighting pipeline 30, and the fire-fighting medium inlet 303 and the fire-fighting medium outlet 304 are respectively connected to end portions of two first portions 301. Regions indicated by broken-line boxes shown in the figure at the fire-fighting medium inlet 303 and the fire-fighting medium outlet 304 are connection regions of the fire-fighting medium inlet 303 and the fire-fighting medium outlet 304 and the end portions of the first portions 301.

Optionally, the fire-fighting medium inlet 303 and the fire-fighting medium outlet 304 may be connected to an inlet valve and an outlet valve, respectively. The inlet valve is configured to fill the fire-fighting pipeline 30 with a fire-fighting medium, on the contrary, the outlet valve is configured to discharge the fire-fighting medium out. Meanwhile, the inlet valve and the outlet valve are provided to implement the circulation of fire-fighting medium in the fire-fighting pipeline 30. In addition, the positions of the valves may be set according to practical applications, for example, the inlet valve and the outlet valve are respectively disposed on two opposite sides of the battery 10. For another example, if the battery 10 includes a plurality of groups of valves, inlet valves of the plurality of groups of valves may be arranged on the same side, and outlet valves of the plurality of groups of valves may be arranged on the same opposite side, but the embodiment of the present application is not limited thereto.

Figure 11:
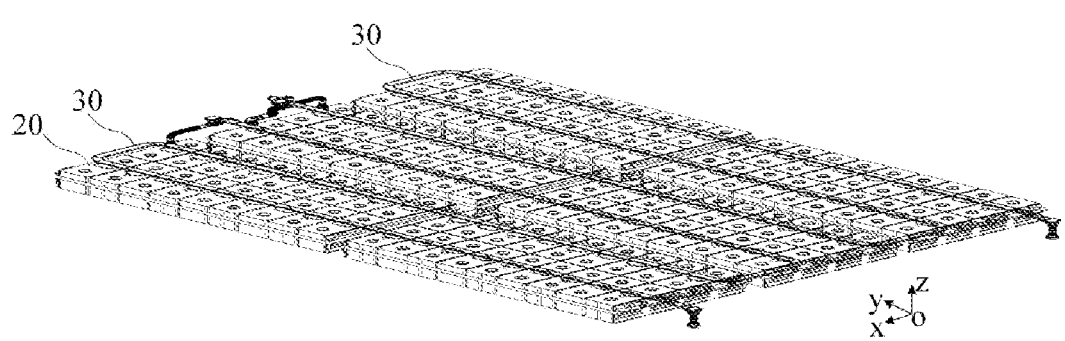
FIG. 11 is a schematic exploded view of a battery according to another embodiment of the present application.
Figure 12:
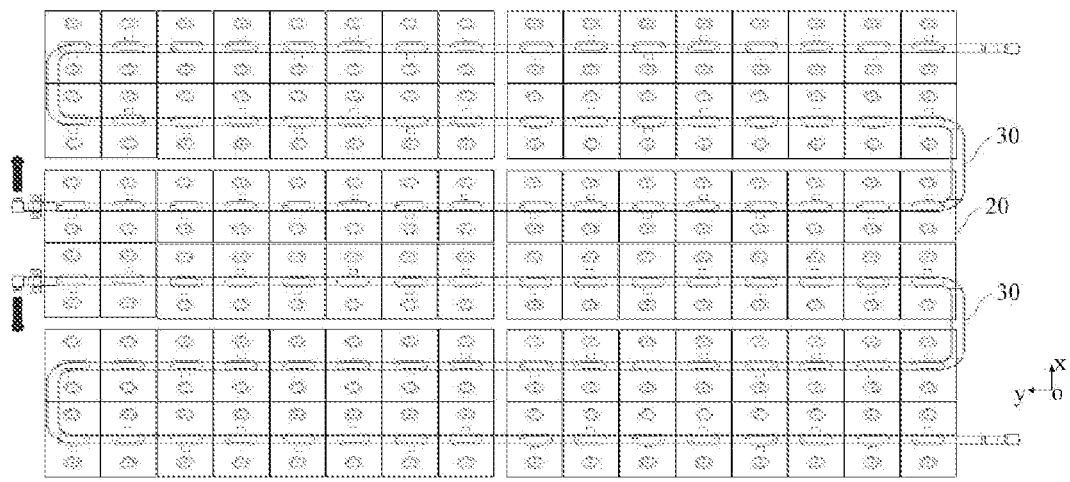
FIG. 12 is a schematic top view of the fire-fighting pipeline in FIG. 11.

FIG. 11 shows a structural schematic diagram of a battery 10 after assembling the fire-fighting pipeline 30 in FIGS. 9 and 10 with a plurality of battery cells 20. FIG. 12 is a schematic top view of the battery 10 in FIG. 11.

As an example, in FIGS. 11 and 12, the battery 10 includes 6×18 battery cells 20, and in a stacking direction, 1×18 battery cells 20 are referred to as a row of battery cells 20. Optionally, two fire-fighting pipelines 30 are provided above the plurality of battery cells 20, and in each fire-fighting pipeline 30, three first portions 301 are located above adjacent three rows of battery cells 20 in one-to-one correspondence. Two second portions 302 are respectively connected to end portions of two adjacent first portions 301.

As shown in FIG. 11 and FIG. 12, according to the position of the pressure relief mechanism in the battery cell 20, the plurality of first portions 301 in the fire-fighting pipeline 30 are disposed above the plurality of pressure relief mechanisms of the plurality of battery cells 20, that is, the plurality of first portions 301 in the fire-fighting pipeline 30 may be disposed on a side of the plurality of pressure relief mechanisms away from an interior of the plurality of battery cells 20.

Optionally, in an embodiment of the present application, in the fire-fighting pipeline 30, a length of the first portion 301 may be equivalent to a length of a row of battery cells 20, for example, the length of the first portion 301 is greater than a length of a connecting line of the pressure relief mechanisms 213 in a row of battery cells 20 and less than or equal to the length of the row of battery cells 20. In general, the end portions of the first portion 301 are located above two sides of a row of battery cells 20. Further, the end portions of the first portion 301 are located above the center of the two sides of a row of battery cells 20.

Since the second portion 302 is configured to connect end portions of two first portions 301, correspondingly the second portion 302 may also be considered to be located on two sides of two rows of battery cells 20.

Optionally, the foregoing two fire-fighting pipelines 30 may be disposed above the plurality of battery cells 20 in any arrangement. For example, as shown in FIG. 12, two fire-fighting pipelines 30 are arranged above the plurality of battery cells 20 in a mirror-symmetric manner. In addition, the two fire-fighting pipelines 30 may also be arranged in other manners, for example, arranged in an array, which is not specifically limited in the embodiment of the present application.

It can be understood that, in FIG. 11 and FIG. 12, the case where the battery 10 includes six rows of battery cells 20 and one fire-fighting pipeline 30 corresponds to three rows of battery cells 20 is taken as an example for description. In addition, one fire-fighting pipeline 30 may also correspond to two, four or more than four rows of battery cells 20, which is not specifically limited in the embodiment of the present application. Moreover, the battery 10 is not limited to include two fire-fighting pipelines 30, it may include only one fire-fighting pipeline 30, or three or more fire-fighting pipelines 30, which is not specifically limited in the embodiment of the present application.

Optionally, the battery 10 further includes a sensing component 15. If the battery 10 includes a plurality of rows of battery cells 20, each row of battery cells 20 is correspondingly provided with a transmission line 152, and a plurality of sensing ports 153 at end portions of a plurality of transmission lines 152 are disposed in regions corresponding to end portions of the plurality of first portions 301.

Optionally, the battery 10 further includes a bus component 12. Optionally, if the battery 10 includes a plurality of rows of battery cells 20, each row or a plurality of rows of battery cells 20 form a battery module, and a bus component 12 is correspondingly provided, and a bus connection port 122 of the bus component 12 is disposed at a side of the sensing port 153 of the sensing component 15.

In some embodiments, an insulating dielectric layer 161 covers the bus unit 121 in the bus component 12 and the sensing unit 151 and the transmission line 152 in the sensing component 15 to form a transmission assembly 16. The bus connection port 122 in the bus component 12 and the sensing port 153 in the sensing component 15 are located on the same side of the insulating dielectric layer 161. Optionally, an area of the insulating dielectric layer 161 may be equal to or close to an area of the first walls of the plurality of battery cells 20 are located in the battery 10.

Figure 13:
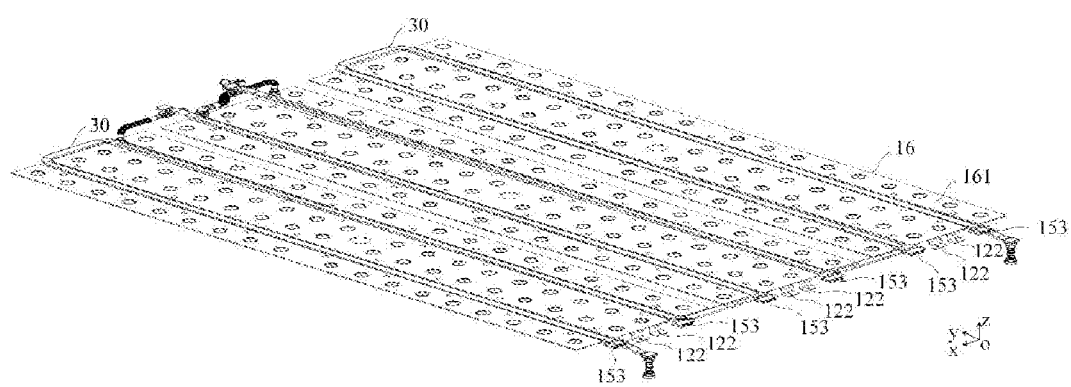
FIG. 13 is a schematic exploded view of a battery according to another embodiment of the present application.

As an example, FIG. 13 shows a structural diagram of a transmission assembly 16 and a fire-fighting pipeline 30.

Optionally, the transmission assembly 16 may be correspondingly disposed between 6×18 battery cells 20 in FIG. 11 (not shown in FIG. 13) and two fire-fighting pipelines 30. Optionally, six sensing ports 153 and six bus connection ports 122 are provided on an edge of the side of an insulating dielectric layer 161.

In an embodiment of the present application, a first portion 301 of the fire-fighting pipeline 30 may be located above a transmission line 152 (not shown in the figure) in a sensing component 15, and a second portion 302 connects two adjacent first portions 301 at edges of two sides of the insulating dielectric layer 161.

Figure 14:
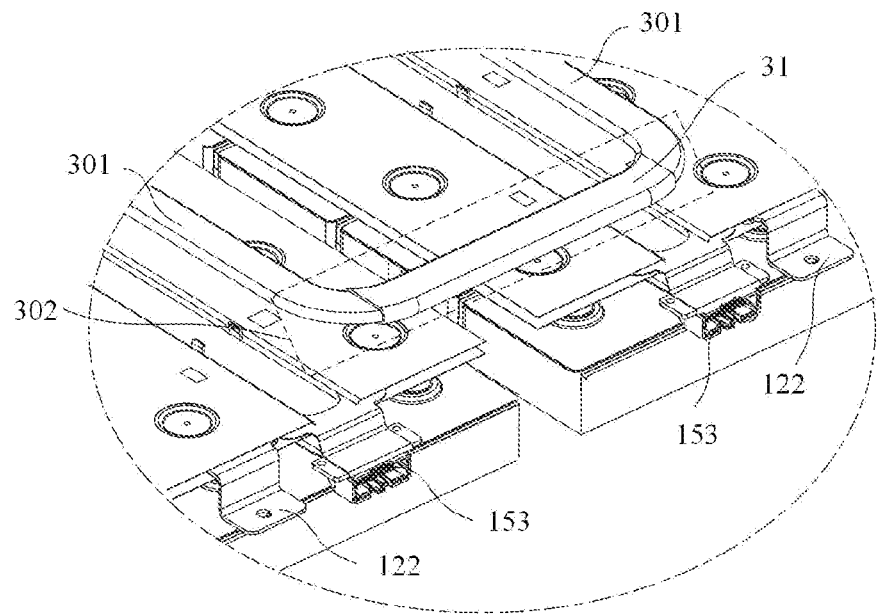
FIG. 14 is a partially enlarged structural diagram of a battery according to an embodiment of the present application.
Figure 15:
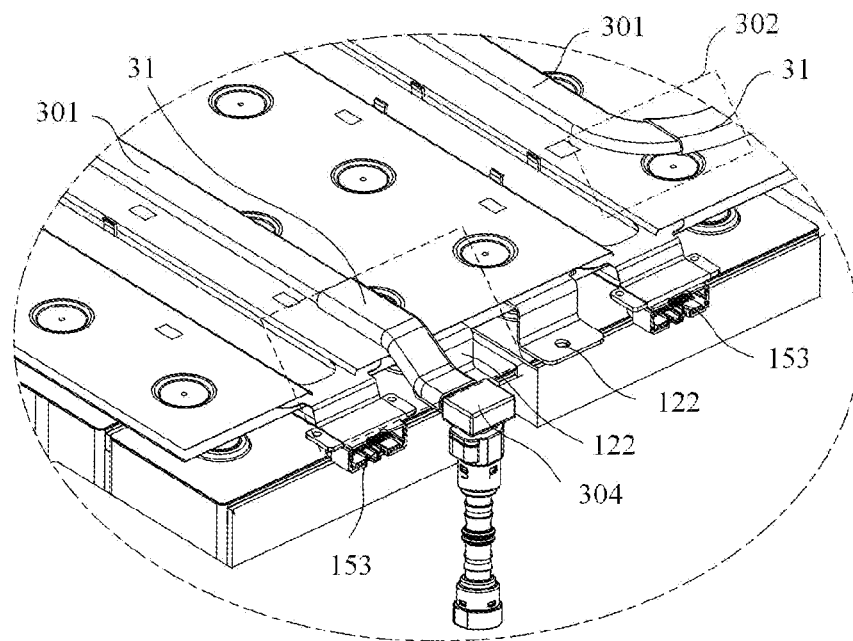
FIG. 15 is a partially enlarged structural diagram of a battery according to another embodiment of the present application.

In order to facilitate the description of the positional relationship of the sensing port 153, the bus connection port 122 and the fire-fighting pipeline 30, FIGS. 14 and 15 show two partially enlarged structural diagrams of a battery 10.

As shown in FIG. 14, two first portions 301 are disposed above two rows of battery cells 20, and a second portion 302 is connected between end portions of the two first portions 301. One end portion of each of the two first portions 301 is located above an edge of one side of a row of battery cells 20. Furthermore, one sensing port 153 of a sensing component 15 is provided on the edge of one side of a row of battery cells 20, and the sensing port 153 is disposed near a position below the end portion of the first portion 301. In order to reduce the probability of forming condensate near the end portion of the first portion 301 and reduce or even eliminate the influence of the condensate on the sensing port 153, an isolation layer 31 may be disposed around the end portion of the first portion 301.

In some embodiments, at least a partial region of the second portion 302 connecting the end portions of the first portion 301 is covered with the isolation layer 31.

As an example, as shown in FIG. 14, at least a partial region of the second portion 302 connecting the end portions of the two first portions 301 is covered with the isolation layer 31, and the second portion 302 is located at an edge of the side of the battery cell 20 where the sensing port 153 is located. If condensate is formed, it is easy to affect the sensing port 153.

In addition to that the second portion 302 is connected to the end portions of the first portion 301, there are other components that can be connected to the end portions of the first portion 301.

Optionally, in an embodiment of the present application, a fire-fighting medium inlet 303 or a fire-fighting medium outlet 304 of the fire-fighting pipeline 30 is connected to the first portion 301, and a connection region of the fire-fighting medium inlet 303 or the fire-fighting medium outlet 304 and the first portion 301 is covered with the isolation layer 31.

As shown in FIG. 15, two first portions 301 are provided above two rows of battery cells 20, the fire-fighting medium outlet 304 (or the fire-fighting medium inlet 303) of the fire-fighting pipeline 30 is connected to one of the first portions 301, and an end portion of the other first portion 301 is connected to the second portion 302.

Similarly to FIG. 14, in FIG. 15, the sensing port 153 is disposed near a position below the end portion of the first portion 301, where one sensing port 153 is close to the fire-fighting medium outlet 304 and the other sensing port 153 is close to the second portion 302. In order to reduce the probability of forming condensate near the end portion of the first portion 301 and reduce the influence of the condensate on the sensing port 153, a connection region (indicated by a broken-line box in the figure) of the first portion 301 and the fire-fighting medium inlet 303 or the fire-fighting medium outlet 304 may be covered with the isolation layer 31, and at least a partial region of the second portion 302 may be covered with the isolation layer 31 to reduce or even eliminate the influence of condensate formation on the sensing port 153.

Further, a bus connection port 122 of a bus component 12 is disposed at the side of a sensing port 153 of a sensing component 15.

As an example, as shown in FIG. 14 and FIG. 15, a sensing port 153 is provided in the middle region of an end portion in a row of battery cells 20, and a bus connection port 122 is provided on the side of the sensing port 153, and the sensing port 153 and the bus connection port 122 are disposed at an edge of the same side of the row of battery cells 20.

As shown in FIGS. 14 and 15, the bus connection port 122 is provided obliquely below the end portion of the first portion 301. In order to reduce the probability of forming condensate near the end portion of the first portion 301 and reduce the influence of the condensate on the bus connection port 122, an isolation layer 31 may be disposed around the end portion of the first portion 301.

It can be seen from FIGS. 14 and 15 that a distance between the bus connection port 122 and the end portion of the first portion 301 is slightly longer than a distance between the sensing port 153 and the end portion of the first portion 301. If the isolation layer 31 covered on the fire-fighting pipeline 30 can reduce the influence of condensate formation on the sensing port 153, it can also reduce the influence of condensate formation on the bus connection port 122.

Therefore, in some embodiments, at least a partial region of the second portion 302 connecting the end portion of the first portion 301 is covered with the isolation layer 31, which reduces the influence of condensate formed on the second portion 302 on the sensing port 153 and also reduces the influence of the condensate on the bus connection port 122. Furthermore, the fire-fighting medium inlet 303 or fire-fighting medium outlet 304 of the fire-fighting pipeline 30 is connected to the first portion 301, and the connection region of the fire-fighting medium inlet 303 or fire-fighting medium outlet 304 and the first portion 301 is covered with the isolation layer 31, so that the influence of condensate formed on the connection region on the sensing port 153 can be reduced, and the influence of the condensate on the bus connection port 122 can also be reduced.

Optionally, in some embodiments, as shown in FIG. 14, a straight line pipeline portion in the second portion 302 is covered with the isolation layer 31, and a connecting portion in the second portion 302 connected to the first portion 302 is not covered with the isolation layer 31.

Optionally, as shown in FIGS. 14 and 15, the first portion 301 may not be covered with the isolation layer 31, and the connecting portions that are not covered with the isolation layer 31 in the first portion 301 and/or the second portion 302 may be configured to adjust the temperature of the battery cell 20.

Optionally, in other embodiments, the straight line pipeline portion and the connecting portion connected to the first portion 302 in the second portion 302 are covered with the isolation layer 31. Alternatively, the end portion of the first portion 301 in the fire-fighting pipeline 30 and other regions near it may also be covered with the isolation layer 31, to further reduce the probability of forming condensate.

Optionally, an orthographic projection of a region covered with the isolation layer 31 in the second portion 302 in a first plane at least partially overlaps an orthographic projection of the plurality of battery cells 20 in the first plane, where the first plane is a plane perpendicular to a height direction of the plurality of battery cells 20.

Optionally, an orthographic projection of a region covered with the isolation layer 31 in the connection region of the fire-fighting medium inlet 303 and/or the fire-fighting medium outlet 304 and the first portion 301 in a first plane at least partially overlaps an orthographic projection of the plurality of battery cells 20 in the first plane.

In some embodiments, the first plane may be a plane where the first face of the plurality of battery cells 20 is located, and an orthographic projection of the plurality of battery cells 20 in the first plane is the first face of the plurality of battery cells 20.

In other embodiments, the first plane may also be a plane parallel to the first face of the plurality of battery cells 20, and an orthographic projection of the plurality of battery cells 20 in the first plane is an orthographic projection of the first face of the plurality of battery cells 20 in the first plane.

Figure 16:
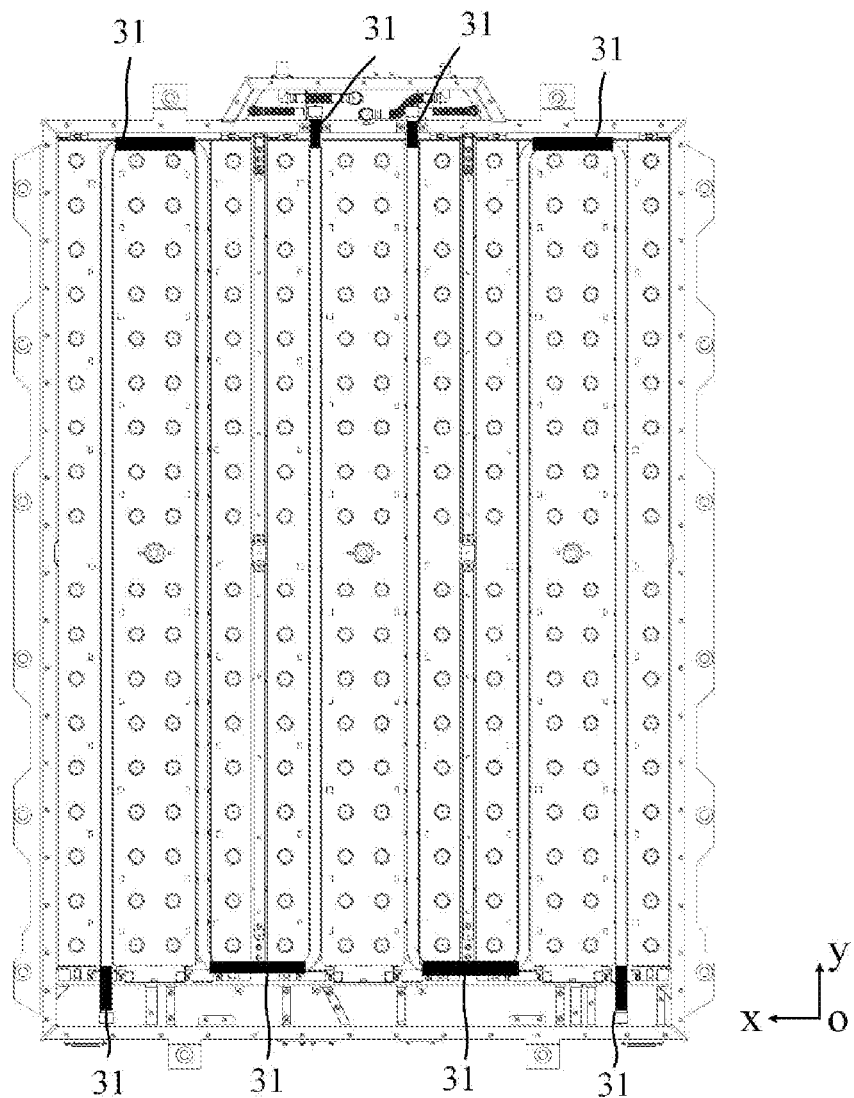
FIG. 16 is a schematic top view of a battery according to an embodiment of the present application.

FIG. 16 shows a schematic top view of a battery 10.

As shown in FIG. 16, orthographic projections (some black regions shown in the figure) of regions covered with the isolation layers 31 in the second portions 302 in the first face of the plurality of battery cells 20 at least partially overlaps the first face of the plurality of battery cells 20.

In addition, orthographic projections (the other black regions shown in the figure) of regions covered with the isolation layers 31 in connection regions of the fire-fighting medium inlet 303 and the fire-fighting medium outlet 304 and the first portions 301 in the first face of the plurality of battery cells 20 at least partially overlaps the first face of the plurality of battery cells 20.

Optionally, in addition to the case that the regions where the isolation layers 31 are provided in the fire-fighting pipeline 30 may be as shown in FIG. 16, an orthographic projection of a region covered with the isolation layer 31 in the second portion 302 in the first plane and an orthographic projection of the plurality of battery cells 20 in the first plane may not overlap each other.

In addition, except for the regions covered with the isolation layers 31 in the second portions 302, orthographic projections of other regions covered with the isolation layers 31 in the fire-fighting pipeline 30 in the first plane and an orthographic projection of the plurality of battery cells 20 in the first plane may not overlap each other. For example, orthographic projections of regions covered with the isolation layers 31 in the connection regions of the fire-fighting medium inlet 303 and the fire-fighting medium outlet 304 and the first portions 301 in the first plane and an orthographic projection of the plurality of battery cells 20 in the first plane do not overlap each other.

In other words, in the embodiment of the present application, orthographic projections of all regions covered with the isolation layers 31 in the fire-fighting pipeline 30 in the first plane and an orthographic projection of the plurality of battery cells 20 in the first plane do not overlap each other.

According to the solution of the embodiment of the present application, the fire-fighting pipeline 30 may be closely disposed above the plurality of battery cells 20, so that a distance between the fire-fighting pipeline 30 and the plurality of battery cells 20 is reduced, thereby improving the temperature adjustment effect of the fire-fighting pipeline 30 on the plurality of battery cells 20. Meanwhile, the space occupied by the fire-fighting pipeline 30 in a height direction of the battery 10 is reduced, and the energy density of the battery 10 is improved.

An embodiment of the present application further provides a power consumption device, which may include the battery 10 in each of the foregoing embodiments. Optionally, the power consumption device may be a vehicle 1, a ship or a spacecraft.

The battery and the power consumption device according to the embodiment of the present application are described above, and a method and device for producing a battery according to an embodiment of the present application will be described below. For the parts not described in detail, reference can be made to the foregoing embodiments.

Figure 17:
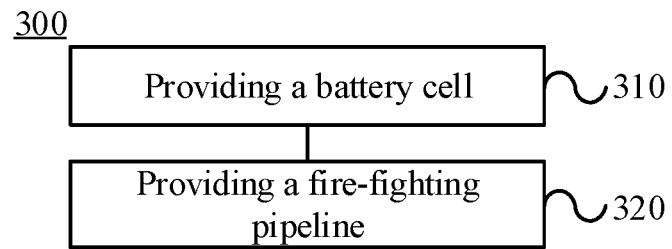
FIG. 17 is a schematic flowchart of a method for producing a battery according to an embodiment of the present application.

FIG. 17 shows a schematic flowchart of a method 300 for producing a battery according to an embodiment of the present application. As shown in FIG. 17, the method 300 may include:

310, providing a battery cell 20, the battery cell 20 including a pressure relief mechanism 213 configured to be actuated when an internal pressure or temperature of the battery cell 20 reaches a threshold, to relieve the internal pressure; and 320, providing a fire-fighting pipeline 30, the fire-fighting pipeline 30 being configured to accommodate a fire-fighting medium and discharge the fire-fighting medium when the pressure relief mechanism 213 is actuated, where the fire-fighting pipeline 30 is covered with an isolation layer 31, and the isolation layer 31 is configured to block the contact of gases and the fire-fighting pipeline 30 so as not to generate condensate.

Figure 18:
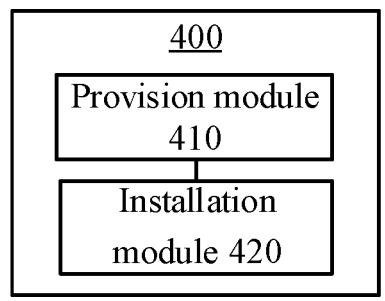
FIG. 18 is a schematic block diagram of a device for producing a battery according to an embodiment of the present application.

FIG. 18 shows a schematic block diagram of a device 400 for producing a battery according to an embodiment of the present application. As shown in FIG. 18, the device 400 for producing the battery may include: a provision module 410 and an installation module 420.

The provision module 410 is configured to: provide a battery cell 20, the battery cell 20 including a pressure relief mechanism 213 configured to be actuated when an internal pressure or temperature of the battery cell 20 reaches a threshold, to relieve the internal pressure; and provide a fire-fighting pipeline 30, the fire-fighting pipeline 30 being configured to accommodate a fire-fighting medium and discharge the fire-fighting medium when the pressure relief mechanism 213 is actuated; and where the fire-fighting pipeline 30 is covered with an isolation layer 31, and the isolation layer 31 is configured to block the contact of gases and the fire-fighting pipeline 30 so as not to generate condensate.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions do not make the nature of the respective technical solutions depart from the spirit and scope of the technical solutions of the embodiments of the present application.

What is claimed is:

1. A battery, comprising:
   a battery cell comprising a pressure relief mechanism configured to be actuated when an internal pressure or temperature of the battery cell reaches a threshold, to relieve the internal pressure; and
   a fire-fighting pipeline configured to accommodate a fire-fighting medium and discharge the fire-fighting medium when the pressure relief mechanism is actuated;
   wherein the fire-fighting pipeline is covered with an isolation layer, and the isolation layer is configured to block the contact of gases and the fire-fighting pipeline so as not to generate condensate;
   wherein the battery further comprises: an insulating dielectric layer disposed between the fire-fighting pipeline and the battery cell, a region of the fire-fighting pipeline corresponding to the insulating dielectric layer is not covered with the isolation layer.

2. The battery according to claim 1, wherein the battery further comprises:
   a bus component comprising a bus unit and a bus connection port;
   wherein the bus unit is configured to implement electrical connection of a plurality of battery cells, and the bus connection port is configured to output electric energy of the plurality of battery cells; and
   the fire-fighting pipeline is covered with the isolation layer in a region corresponding to the bus connection port.

3. The battery according to claim 2, wherein the battery further comprises:
   a sensing component comprising a sensing unit, a transmission line, and a sensing port;
   wherein the sensing unit is configured to sense states of the plurality of battery cells, and the sensing port is configured to output state signals of the plurality of battery cells through the transmission line; and
   the fire-fighting pipeline is covered with the isolation layer in a region corresponding to the sensing port.

4. The battery according to claim 3, wherein the bus connection port and the sensing port of the sensing component are located on a same side of the plurality of battery cells.

5. The battery according to claim 2, wherein the fire-fighting pipeline comprises a plurality of first portions and at least one second portion, the plurality of first portions are disposed parallel to each other and extend along a stacking direction of the plurality of battery cells, and each second portion of the at least one second portion is connected to end portions of two adjacent first portions among the plurality of first portions;
   wherein the plurality of first portions are disposed on a side of a plurality of pressure relief mechanisms of the plurality of battery cells away from an interior of the plurality of battery cells.

6. The battery according to claim 5, wherein the sensing port of the sensing component of the battery is disposed in a region corresponding to an end portion of the first portion.

7. The battery according to claim 5, wherein the bus connection port of the bus component is disposed at a side of the sensing port of the sensing component of the battery.

8. The battery according to claim 5, wherein at least a partial region of the second portion is covered with the isolation layer.

9. The battery according to claim 5, wherein an orthographic projection of a region, covered with the isolation layer in the second portion, in a first plane and an orthographic projection of the plurality of battery cells in the first plane do not overlap each other, wherein the first plane is a plane perpendicular to a height direction of the plurality of the battery cells.

10. The battery according to claim 5, wherein a fire-fighting medium inlet or a fire-fighting medium outlet of the fire-fighting pipeline is connected to the first portion, and a connection region of the first portion and the fire-fighting medium inlet or fire-fighting medium outlet is covered with the isolation layer.

11. The battery according to claim 5, wherein the plurality of first portions are not covered with the isolation layer, and the plurality of first portions are configured to cool the plurality of battery cells.

12. The battery according to claim 3, wherein the fire-fighting pipeline comprises a plurality of first portions and at least one second portion, the plurality of first portions are disposed parallel to each other and extend along a stacking direction of the plurality of battery cells, and each second portion of the at least one second portion is connected to end portions of two adjacent first portions among the plurality of first portions;

wherein the plurality of first portions are disposed on a side of a plurality of pressure relief mechanisms of the plurality of battery cells away from an interior of the plurality of battery cells.

13. The battery according to claim 12, wherein the sensing port of the sensing component of the battery is disposed in a region corresponding to an end portion of the first portion.

14. The battery according to claim 13, wherein the bus connection port of the bus component is disposed at a side of the sensing port of the sensing component of the battery.

15. The battery according to claim 1, wherein the isolation layer is made of a non-water absorbent material.

16. The battery according to claim 15, wherein the isolation layer is closed-cell foam, and cells in the closed-cell foam are all closed cells.

17. The battery according to claim 1, wherein the isolation layer is configured to isolate the fire-fighting pipeline from the bus component.

18. The battery according to claim 1, wherein a thickness of the isolation layer is greater than 1 mm.

19. A power consumption device, comprising a battery, wherein the battery comprises:

a battery cell comprising a pressure relief mechanism configured to be actuated when an internal pressure or temperature of the battery cell reaches a threshold, to relieve the internal pressure; and a fire-fighting pipeline configured to accommodate a fire-fighting medium and discharge the fire-fighting medium when the pressure relief mechanism is actuated;

wherein the fire-fighting pipeline is covered with an isolation layer, and the isolation layer is configured to block the contact of gases and the fire-fighting pipeline so as not to generate condensate;

wherein the battery further comprises: an insulating dielectric layer disposed between the fire-fighting pipeline and the battery cell, a region of the fire-fighting pipeline corresponding to the insulating dielectric layer is not covered with the isolation layer.

20. The battery according to claim 1, wherein the battery further comprises:

a bus component comprising a bus unit and a bus connection port;

wherein the bus unit is configured to implement electrical connection of a plurality of battery cells, and the bus connection port is configured to output electric energy of the plurality of battery cells;

the insulating dielectric layer is configured to cover at least part of the area of the bus unit and leave the bus connection port, and the insulating dielectric layer is configured for insulation between the bus unit and the fire-fighting pipeline and configured for insulation between the plurality of battery cells and fire-fighting pipeline; and the fire-fighting pipeline is covered with the isolation layer in a region corresponding to the bus connection port, and the fire-fighting pipeline is not covered with the isolation layer in a region corresponding to the insulating dielectric layer.

* * * * *